(12) United States Patent
Alm et al.

(10) Patent No.: US 8,656,702 B2
(45) Date of Patent: Feb. 25, 2014

(54) EXHAUST GAS AFTER TREATMENT SYSTEM

(75) Inventors: Christer Alm, Göteborg (SE); Ingemar Eckerström, Landvetter (SE); Hans Bernler, Mölndal (SE); Johan Bengtsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 502 days.

(21) Appl. No.: 12/528,090

(22) PCT Filed: Feb. 21, 2008

(86) PCT No.: PCT/SE2008/000148
§ 371 (c)(1), (2), (4) Date: Jan. 12, 2010

(87) PCT Pub. No.: WO2008/103111
PCT Pub. Date: Aug. 28, 2008

(65) Prior Publication Data
US 2010/0139249 A1 Jun. 10, 2010

(30) Foreign Application Priority Data
Feb. 21, 2007 (SE) .................................... 0700438

(51) Int. Cl.
*F01N 3/20* (2006.01)
(52) U.S. Cl.
USPC .................................. 60/285; 60/297; 60/301
(58) Field of Classification Search
USPC ................ 60/285, 295, 297, 301, 303, 286
See application file for complete search history.

(56) References Cited

U.S. PATENT DOCUMENTS

| 6,134,883 A | 10/2000 | Kato et al. |
| 6,209,316 B1 | 4/2001 | Duvinage et al. |
| 6,753,294 B1 * | 6/2004 | Brisley et al. ............ 502/439 |

(Continued)

FOREIGN PATENT DOCUMENTS

| DE | 102005036712 A1 | 2/2007 |
| EP | 1054722 B1 | 12/2001 |

(Continued)

OTHER PUBLICATIONS

International Search Report for corresponding International Application PCT/SE2008/000148.
International Preliminary Report on Patentability for corresponding International Application PCT/SE2008/000148.

*Primary Examiner* — Kenneth Bomberg
*Assistant Examiner* — Jonathan Matthias
(74) *Attorney, Agent, or Firm* — WRB-IP LLP

(57) ABSTRACT

An exhaust gas after treatment system includes a diesel particulate filter unit (DPFU) provided downstream of a diesel engine, a selective catalytic reduction (SCR) arrangement provided in fluid communication with said DPFU, a first injector for feeding reducing agent into the exhaust gas provided downstream of said DPFU and upstream of said SCR, at least one NOx sensor provided downstream of said SCR for providing at least one NOx signal to a NOx coordinator, at least one temp sensor provided upstream and/or downstream of said SCR for providing at least one temp signal to said NOx coordinator, wherein said NOx coordinator is provided for switching said diesel engine into a high NOx mode or a low NOx mode depending on the values of the at least one NOx signal and the at least one temp signal.

35 Claims, 5 Drawing Sheets

(56) References Cited

U.S. PATENT DOCUMENTS

| | | |
|---|---|---|
| 6,941,747 B1 | 9/2005 | Houston et al. |
| 2006/0153761 A1* | 7/2006 | Bandl-Konrad et al. .. 423/239.1 |
| 2007/0062179 A1 | 3/2007 | Leone |
| 2008/0034732 A1* | 2/2008 | Hosoya et al. ................. 60/276 |
| 2008/0066456 A1 | 3/2008 | Schmieg et al. |

FOREIGN PATENT DOCUMENTS

| | | | |
|---|---|---|---|
| JP | 2006002663 A | * | 1/2006 |
| JP | 2006274844 A | * | 10/2006 |

* cited by examiner

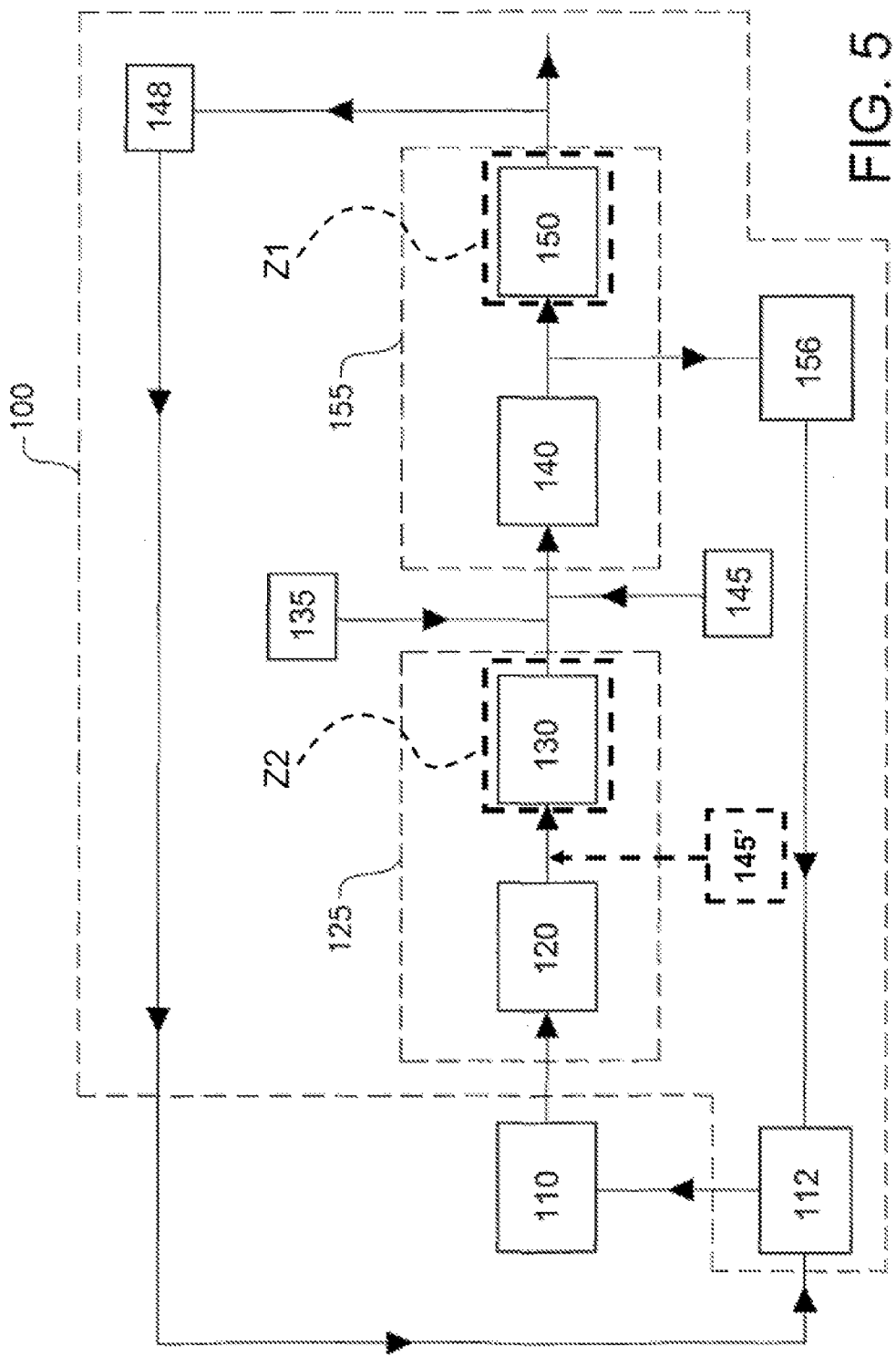

EXHAUST GAS AFTER TREATMENT SYSTEM

BACKGROUND AND SUMMARY

The present invention relates to a method and apparatus for purifying exhaust gases from a diesel engine, more particularly the present invention relates to a method and apparatus for purifying exhaust gases from a diesel engine which is capable of removing particulates and NOx contained in the exhaust gases.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has an efficiency of up to about 52% and is thus the best converter of fossil energy. NOx emission concentration is dependent upon local oxygen atom concentration and the local temperature. Said high efficiency is however only possible at an elevated combustion temperature at which high NOx levels are inevitable. Moreover, a suppression of NOx formation by internal means (air/fuel ratio) has the tendency to cause an increase in particulates, known as the NOx-particulates trade off. Furthermore, an excess of oxygen in the exhaust gas from a diesel engine prevents the use of stoichiometric 3-way-catalyst technology for reduction of NOx as is used in gasoline engine cars from the late 80-ties.

Reducing the oxides of nitrogen (NOx) and particulate matter (PM) in exhaust gases from a diesel engine has become a very important problem in view of the protection of environment and the saving of finite fossil energy supply. For the coming legislation (US10, EU V1 etc) it may be necessary to have a combination of a diesel oxygen catalyst (DOC), a diesel particulate filter (DPF) and a selective catalytic reduction (SCR) catalyst in the exhaust system.

When optimizing in-cylinder combustion for maximum fuel efficiency generally gives high NOx levels in the exhaust gases. This is a problem with the nowadays stringent emission legislation, since the after treatment system can only reduce a certain amount of the NOx. Hence there is a trade-off between fuel efficiency and being emission compliant.

Lower engine-out NOx also reduces passive DPF regeneration. This may lead to an increased frequency of O2-based DPF regenerations (where applicable), which tends to deteriorate the EATS-system (DOC+DPF+SCR) at an accelerated rate. Hence less passive regeneration may lead to the need of having larger EATS-system, to compensate for increased deterioration. There is also an additional fuel penalty during the O2-based regeneration.

As explained above, there is a problem associated with prior art methods and apparatuses for purifying exhaust gases from a diesel engine.

It is desirable to provide an exhaust gas after treatment system and method which at least reduce the above mentioned problems.

According to a first aspect of the invention an exhaust gas after treatment system comprising a diesel particulate filter unit (DPFU) provided downstream of a diesel engine. A selective catalytic reduction (SCR) arrangement provided in fluid communication with said DPFU, A first injector for feeding reducing agent into the exhaust gas provided downstream of said DPFU and upstream of said SCR. At least one NOx sensor provided downstream of said SCR for providing at least one NOx signal to a NOx coordinator. At least one temp sensor provided upstream and/or downstream of said SCR for providing at least one temp signal to said NOx coordinator. Said NOx coordinator is provided for switching said diesel engine into a high NOx mode or a low NOx mode depending on the values of the at least one NOx signal and/or the at least one temp signal.

An advantage of an aspect of the present invention is that it maximises passive soot generation.

Another advantage of an aspect of the present invention is that the number of active O2 based regenerations may be kept to a minimum.

Still another advantage of an aspect of the present invention is that it allows for a low fuel and reducing agent consumption while maintaining a NOx emission below the legislation levels.

Still another advantage of an aspect of the present invention is that it allows the engine to be optimized for lowest fuel consumption at the right tail out NOx level.

Yet another advantage with an aspect of the present invention is that is also optimizes the usage of the SCR catalyst NOx conversion rate.

Still another advantage of an aspect of the present invention is that it allows the engine to be optimized for passive regeneration.

Still another advantage with an aspect of the present invention is that the number of active O2 based regenerations may be kept to a minimum.

Still another advantage with an aspect of the present invention is that it compensates for environmental effects (different conversion rates) and/or compensates for aging effects on the SCR and the engine.

Still another advantage with an aspect of the present invention is that it allows detection of problems with the SCR system.

Another advantage with an aspect of the present invention is that it will be possible to use a smaller SCR-catalyst, giving both cost, space and weight benefits.

The engine may be switched into said low or high NOx mode by changing for instance one or more of the following parameters: amount of exhaust gas recirculation (EGR), boost pressure, timing of fuel injection, fuel injection pressure, number of fuel injections. Said switching from high to low NOx mode may be performed when NOx signal is above a predetermined threshold value. Said switching from low to high NOx mode may be performed when NOx signal is below a predetermined threshold value and said temperature signal is between a first temperature T1 and a second temperature 12. Said switching from low to high NOx mode may also be dependent on the content of the NOx-reducing agent in the tank.

In an example embodiment of the present invention said DPFU comprising a DPF coated with an oxidation catalyst material. An advantage with that is that space, weight and cost may be further reduced.

In still another example embodiment a heat generator is provided between said diesel engine and said DPFU. An advantage with said embodiment is that optimal working temperature for the EATS may be achieved on demand irrespective of the load and RPM of the engine.

In still another example embodiment of the present invention a NO2 reduction catalyst is provided between in fluid communication with the DPFU and said SCR. An advantage with this embodiment is that NO/NO2 ration may be optimized for the SCR irrespective of the age of the EATS.

According to another aspect of the invention said exhaust gas after treatment method comprising the actions of: oxidizing NO into NO2 and trapping combustion particles in a diesel particulate filter unit (DPFU) provided in fluid communication with a diesel engine, reducing NO2 into NO in a selective catalytic reduction (SCR) arrangement arranged in fluid communication with said DPF, injecting a reducing agent by a first injector into the exhaust gas arranged downstream said DPFU and upstream of said SCR, providing a NOx signal to a NOx coordinator from at least one NOx sensor provided downstream of said SCR, providing a temperature signal to said NOx coordinator from at least one temperature sensor provided upstream and/or downstream of said SCR, switching said diesel engine into a high NOx mode or a low NOx mode depending on the values of the at least one NOx signal and/or the at least one temperature signal.

According to another aspect of the invention a computer program storable on a computer readable medium, comprising a program code for use in a method comprising the actions of: oxidizing NO into NO2 and trapping combustion particles in a diesel particulate filter unit (DPFU) provided in fluid communication with a diesel engine, reducing NO2 into NO in a selective catalytic reduction (SCR) arrangement arranged in fluid communication with said DPF, injecting a reducing agent by a first injector into the exhaust gas arranged downstream said DPFU and upstream of said SCR, providing a NOx signal to a NOx coordinator from at least one NOx sensor provided downstream of said SCR, providing a temperature signal to said NOx coordinator from at least one temperature sensor provided upstream and/or downstream of said SCR, switching said diesel engine into a high NOx mode or a low NOx mode depending on the values of the at least one NOx signal and/or the at least one temperature signal.

This computer program can be adapted to be downloaded to a support unit or one of its components when run on a computer which is connected to the internet.

BRIEF DESCRIPTION OF THE DRAWINGS

With reference to the appended drawings below follows a more detailed description of embodiments of the invention cited as examples.

In the drawings:

FIG. 5 shows a schematic illustration of a fifth example embodiment of an exhaust gas after treatment system according to the present invention in fluid connection with an internal combustion engine.

Figure 1:
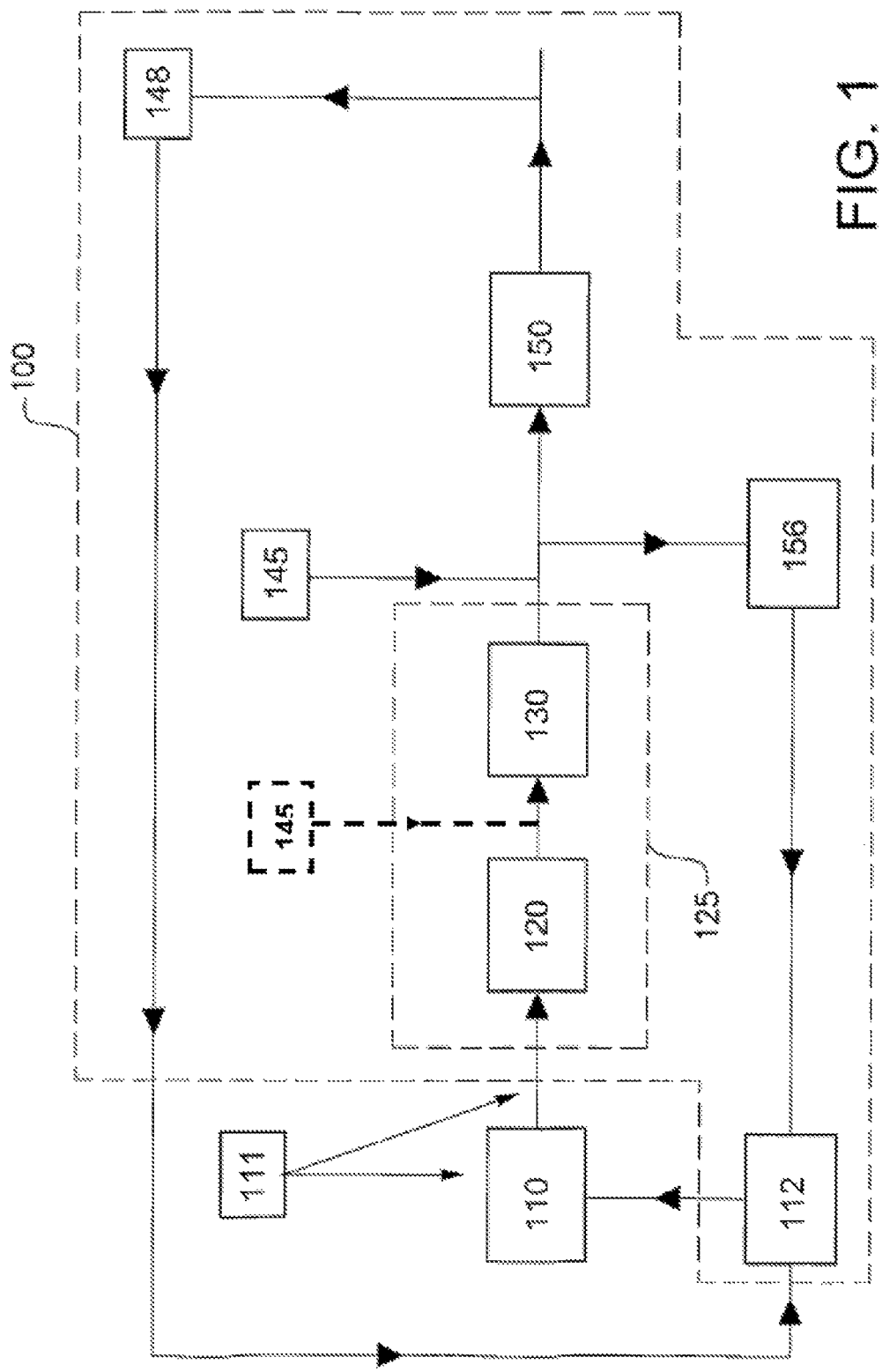
FIG. 1 shows a schematic illustration of a first example embodiment of an exhaust gas after treatment system according to the present invention in fluid connection with an internal combustion engine.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

In FIG. 1 a first example embodiment of an exhaust gas after treatment system (EATS) 100 according to the present invention is schematically illustrated. Said EATS is fluidly connected to an internal combustion engine 110, e.g., a diesel engine. Said EATS 100 comprising a diesel particulate filter unit (DPFU) 125, a selective catalytic reduction (SCR) 150, a first reductant injector 145, a temperature sensor 156, a NOx sensor 148 and a NOx coordinator 112.

The DPFU 125 is in direct fluid communication with the internal combustion engine 110. Said DPFU 125 comprises a diesel oxidation catalyst (DOC) 120 and a diesel particulate filter (DPF) 130. The DOC 120 is in this embodiment arranged upstream of said DPF 130.

The reaction taking place in the DOC 120 may be as follows:

$$NO + 1/2 O_2 \rightarrow NO_2 \tag{1}$$

The temperature in the DOC 120 is depending inter alia of catalyst material; HC, CO and O2 content and mass flow. The catalytic reaction may start in DOC 120 at about 2000 C and may have its maximum catalytic reaction temperature of about 300-4000 C. After reaching the maximum reaction temperature the reaction may decline, which declining is depending on the equilibrium reaction, where the reverse reaction $$NO_2 \rightarrow 1/2 O_2 + NO \tag{2}$$

is more temperature dependent than equation (1).

The DOC 120 is usually built up in the form of a monolithic structure made of cordierite or metal. Said monolithic structure may be coated with a catalytic material in the form of a base metal oxide and a precious metal, which could be Platinum and/or Palladium.

The reaction taking place in the DPF (130) may be as follows:

$$2 NO_2 + C \rightarrow NO + CO_2 \tag{3}$$

The temperature in the DPF 130 may be affected by the thickness of the soot layer in the DPF 130 and may be as low as about 200° C., but becomes effective above 250° C. At higher temperatures than about 700° C., the aging of the DPF 130 as such and the catalyst(s) arranged downstream said DPF 130 may be heavily affected.

The DPF 130 may be built up from porous forms of cordierite or silicon carbide or sintered metal powder. Said porous form may be coated with a catalytic material in the form of a base metal oxide and a precious metal, which could be Platinum and/or Palladium.

If too much soot is trapped in the DPF 130, which may be caused by a too low temperature and/or to low NOx/soot from the engine, one may use An optional heat generator upstream said DPFU 125 in order to heat the DPF 130 to an appropriate working temperature. Said heat generator may take different forms. In a first example embodiment the temperature in the DPF 130 may be raised on demand by post-injection of diesel into one or more cylinders of the internal combustion engine 110 and/or injecting diesel into the exhaust system upstream of said DOC 120, denoted by 111 in FIG. 1. The reaction in the DOC 120 may under such circumstances be as depicted by equation (4) instead of the equation as depicted above by (1):

$$3 O_2 + 2 CH_2 \rightarrow 2 CO_2 + 2 H_2O \tag{4}$$

The temperature of the reaction (4) depends inter alia of the content of HC. It may start at 200° C. for reaching DOC outlet temperature of about 350° C. and may start at 280° C. for reaching a peak temperature of 600° C.

The catalytic material and/or the temperature in the DOC 120 affect which one of the equations (1) or (4) is dominating. One may optimize for reaction No. (4), if the purpose of DOC 120 is to increase the temperature of the exhaust gases and one may optimize for reaction No. (1), if the purpose of the DOC 120 is to produce NO2.

Another example of heat generator may be an electric heated catalyst.

If the NOx/soot is high it is only required to increase of the temperature in the DOC 120 to about 400° C. for removing SOx which prohibits reaction No (1).

Another reaction taking place in the DPF 130 is as follows:

$$O2+C\rightarrow CO2 \quad (5)$$

The temperature of reaction (5) is about 600° C., which may be somewhat decreased if the filter is coated with catalyst or if the fuel is added with catalyst. The lower temperature may necessitate a catalyst material added to the fuel, which in turn is adsorbed by the soot particles.

The SCR 150 is in this embodiment arranged downstream said DPFU 125. The reactions that may take place in the SCR 150 may be as follows:

$$4NO+4NH3+O2\rightarrow 4N2+6H2O \quad (6)$$

$$2NO+2NO2+4NH3\rightarrow 4N2+6H2O \quad (7)$$

$$6NO2+8NH3\rightarrow 7N2+12H2O \quad (8)$$

$$4NO2+4NH3\rightarrow 2N2+2N2O+6H2O \quad (9)$$

Because reaction No. (7) is the fastest reaction of reactions (6)-(9) and to avoid reaction No. (9), one wants to keep the ratio of NO/NO2 of about 50:50.

Reaction No (7) may be effective in a temperature range in the SCR 150 from about 200° C. and higher, the reaction starts however at much lower temperatures, but the lower the temperature the slower the reaction. The starting temperature for reaction No (6) in the SCR 150 may be about 250° C. Starting points and temperature ranges is somewhat affected by the choice of catalytic material in the SCR 150.

The SCR 150 may be built up in the form of a monolithic structure made of cordierite or metal. Said structure may either be coated with Vanadium oxide on top of a titanium oxide comprising some amount of wolfram oxide or a coating comprising zeolite. The zeolite may comprise some iron or copper content or some other appropriate anti ion. There are also vanadium oxide catalysts which are extruded to monolithic structures, i.e., the catalyst and structure is made of the same material.

In the embodiment as illustrated in FIG. 1, an injector 145 is arranged between the DPFU 125 and the SCR 150. Said injector injects a reductant material upstream of said SCR 150. The reductant material may be urea, ammonia, ammonia absorbed in water, ammonium carbonate, or metal chloride salts which may adsorb ammonia.

The NOx coordinator 112 receives information from the NOx sensor 148 and the temperature sensor 156. By the use of NOx sensors and temperature sensors it may be possible to optimize the efficiency of the SCR system. The efficiency of the SCR system 150 may be dependent on the temperature and/or the aging status, and different engine modes may be optimized for obtaining the best overall efficiency. The momentary SCR efficiency can be measured with the temperature sensor 156 and the NOx sensor 148.

It may for example be possible to switch to a mode suitable for a higher passive regeneration of the DPF 130 when the SCR catalyst 150 and the exhaust are in physical/chemical states allowing good NOx conversion. Parameters affecting this are for example temperature, exhaust mass flow, composition of NOx, adsorbed ammonia, adsorbed poisons (as hydrocarbons and metals) and the state of thermal degradation. When the efficiency of the SCR 150 is in a range allowing high NOx conversion, it may for example be possible to switch to a high-NOx-mode, giving a better passive DPF 120 regeneration. Normally the high-NOx-mode may also give lower fuel consumption but higher reducing agent consumption, in situations when the SCR 150 is in a state when the there is not a high NOx conversion e.g. the temperature of the SCR 150 is temporarily at a lower level, the NOx emissions from the engine may be lowered in order to obtain the desired tail pipe emissions of NOx.

Engine out NOx emissions is measured by NOx sensor 148 provided downstream said SCR 150. The NOx sensor 148 measurement (and NOx conversion rate) is used to control the engine out NOx. The engine out NOx is a continuous value controlled by the NOx coordinator 112. The NOx coordinator 112 uses a function between two stationary modes in order to achieve the desired engine out NOx. The conversion rate in the SCR 150 will not change rapidly, but the NOx level after the SCR 150 will follow the NOx level into the SCR 150. This makes it possible to have a closed loop control controlled by the NOx coordinator 112 provided with information from the NOx sensor 148 and the temperature sensor 156. The NOx coordinator is both a controller and has also the desired value(s) (threshold value(s)) for the control. If the engine is in a low NOx mode (=high soot) mode all time it may be an indication of a damaged catalyst.

The NOx coordinator 112 provided with temperature signals from the temperature sensor 156 and NOx signals from the NOx sensor 148 may, depending on the values of said signals, set the engine in at least two different modes, a high NOx mode and a low NOx mode. The NOx coordinator regulates the management of the engine, i.e., said NOx coordinator may inter alia change one or more of the following parameters: the degree of exhaust gas recirculation (EGR); change the boost pressure of a turbo charger; change a timing of main and/or auxiliary fuel injection(s) into the combustion chamber; change the pressure of fuel injection; change the temperature in the combustion chamber, and/or change the number of fuel injections per working cycle of the engine. For example increased EGR results in decreased NOx, increased boost pressure results in increased NOx; delayed fuel injection timing results in decreased NOx.

The SCR 150 has an optimal or best working range with high conversion capability of NO2 to NO within a temperature interval from a first temperature T1 to a second temperature T2. The values of the first temperature T1 and the second temperature T2 is dependent inter alia on the type of SCR 150 and the age of the SCR 150. Said temperature interval, and especially the first temperature T1, is depending on the ratio of NO/NO2, which in turn depends on the state of the previous of components in the EATS. T1 and T2 are also affected by the space velocity of the exhaust gases. With an aged SCR 150 the temperature interval will be narrower compared to a fresh SCR 150. The SCR 150 may be temporarily poisoned by inter alia HC and/or ammonia, i.e., if the SCR 150 is used at a prolonged period of time at a low temperature T1, then the conversion capability will drop to a low value. Said poisoning may be cured by elevating the temperature of the SCR 150. Elevation of temperature may be caused by different means, such as separate heat generators provided upstream of the SCR 150, injection of fluid into the combustion chamber and/or the exhaust system upstream of the SCR 150, increasing the backpressure upstream the SCR 150 by means of an adjustable restriction.

For the NOx coordinator 112 to change the from high NOx mode to low NOx mode it requires that a filtered signal from the NOx sensor is above a predetermined threshold value. The threshold value can be a fraction (near one) of the legislation value. Normally the legislation value is given as a specific value and hence the signal has to be transformed to that.

For the NOx coordinator 112 to change from low NOx mode to high NOx mode it requires that a filtered signal from the NOx sensor 148 is below a certain value and that the temperature of the SCR 150, given by the temperature signal from temperature sensor 156, is within T1 and T2 and/or that the soot level in the DPF is above a predetermined value. This soot value may be correlated from a pressure drop over the DPF or by a physical model.

One can say that high NOx mode is used as long as the NOx sensor 148 detects low values, i.e., under the threshold value. If switching from low NOx mode to high NOx mode and the NOx sensor 148 detects NOx levels above said threshold value, said NOx coordinator 112 immediately switches back to low NOx mode. This will mean that some temporarily NOx emission will take place and usually this may be a result of too generous threshold values. This can be caused by parameters not well measured, e.g., poisons or aging of the catalyst. By statistical treatment of these occurrences the thresholds can be adaptively correlated. If setting the threshold values to more stringent values, this may never happen.

Figure 2:
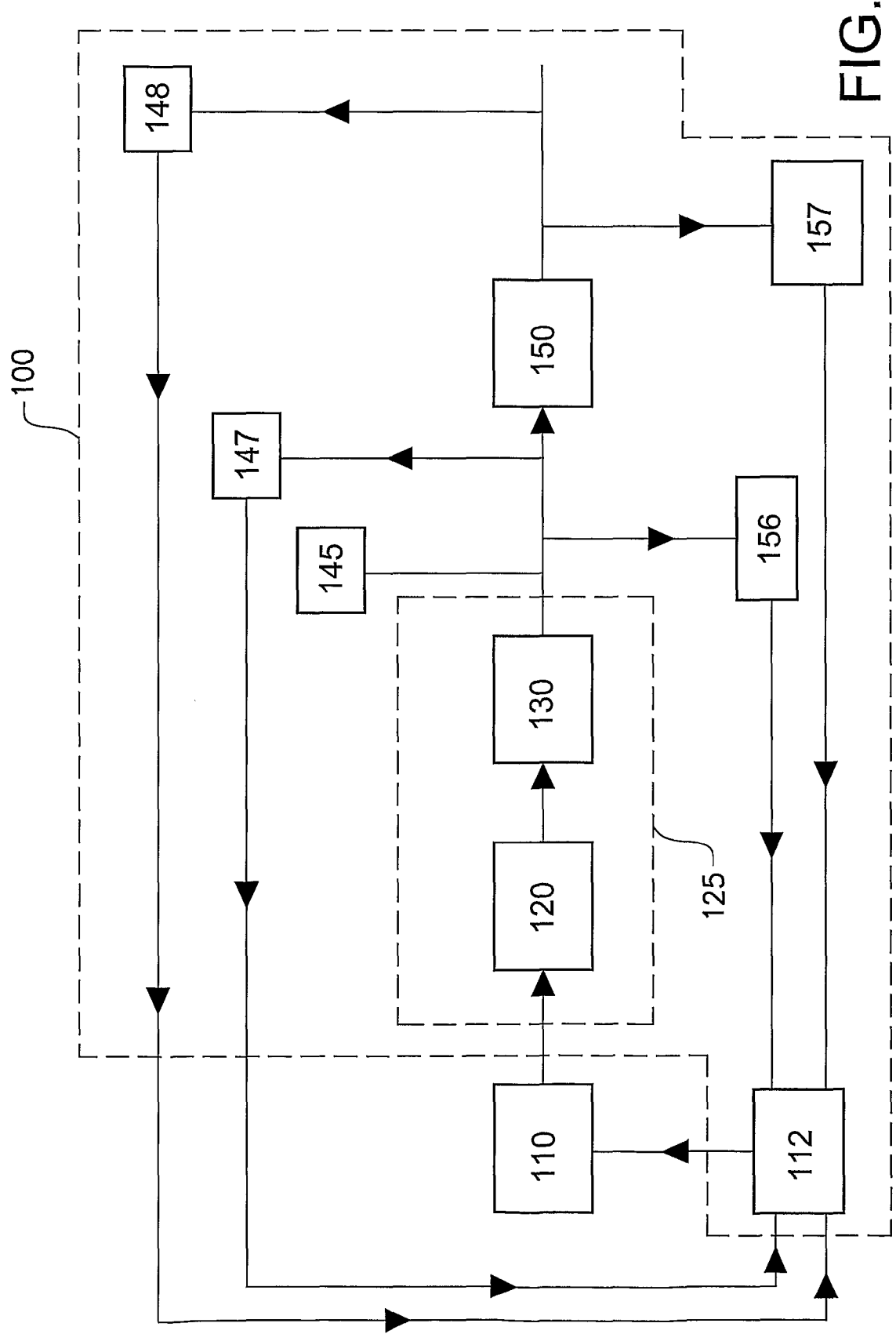
FIG. 2 shows a schematic illustration of a second example embodiment of an exhaust gas after treatment system according to the present invention in fluid connection with an internal combustion engine.

FIG. 2 illustrates another example embodiment of the present invention. The only difference between this embodiment and the one disclosed in FIG. 1 is that there is provided a second temperature sensor 157 downstream of said SCR 150 and a second NOx sensor 147 provided upstream of said SCR 150. In this embodiment one will have a first temperature sensor upstream said SCR, a second temperature sensor downstream of said SCR 150, a first NOx sensor upstream of said SCR and a second NOx sensor downstream of said SCR 150. The advantage with this arrangement is that one will have better control of the temperature in and out of the SCR 150 and also better control of the NOx in and out of the SCR 150. This may give as an effect that the response time for switching from one mode to another may be shortened.

Figure 3:
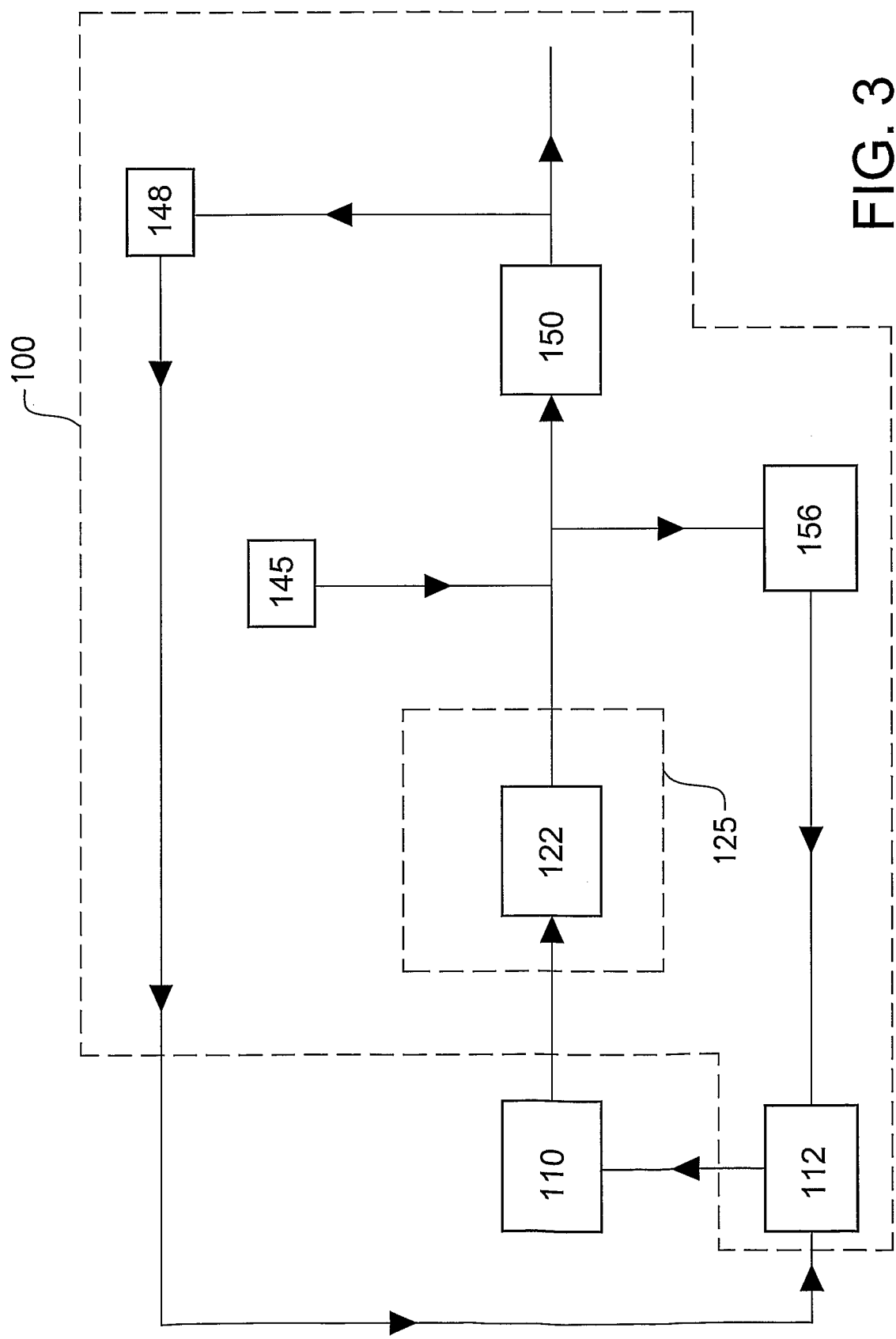
FIG. 3 shows a schematic illustration of a third example embodiment of an exhaust gas after treatment system according to the present invention in fluid connection with an internal combustion engine.

FIG. 3 illustrates another example embodiment of the exhaust gas after treatment system (EATS) 100 according to the present invention. Said embodiment only differs to the preceding embodiment in that the DPFU 125 comprises a DPF coated with a DOC material 122 instead of as in FIG. 1 where said DOC 120 and DPF 130 were separate units. The other features uses same reference numbers as I FIG. 1 and needs therefore no further clarification since the functionality and structure may be the same. Another difference to the embodiment as illustrated in FIG. 1 is that the injector 111 has been omitted. Clearly, said injector 111 could also be omitted from the embodiment as depicted in FIG. 1, i.e., the injector 111 in FIG. 1 is optional.

The reaction taking place in the DPFU 125 in FIG. 2 is similar to the reaction taking place in the DPF 130 and DOC 120 as illustrated in FIG. 1, i.e. reactions No. (1) and (3).

Figure 4:
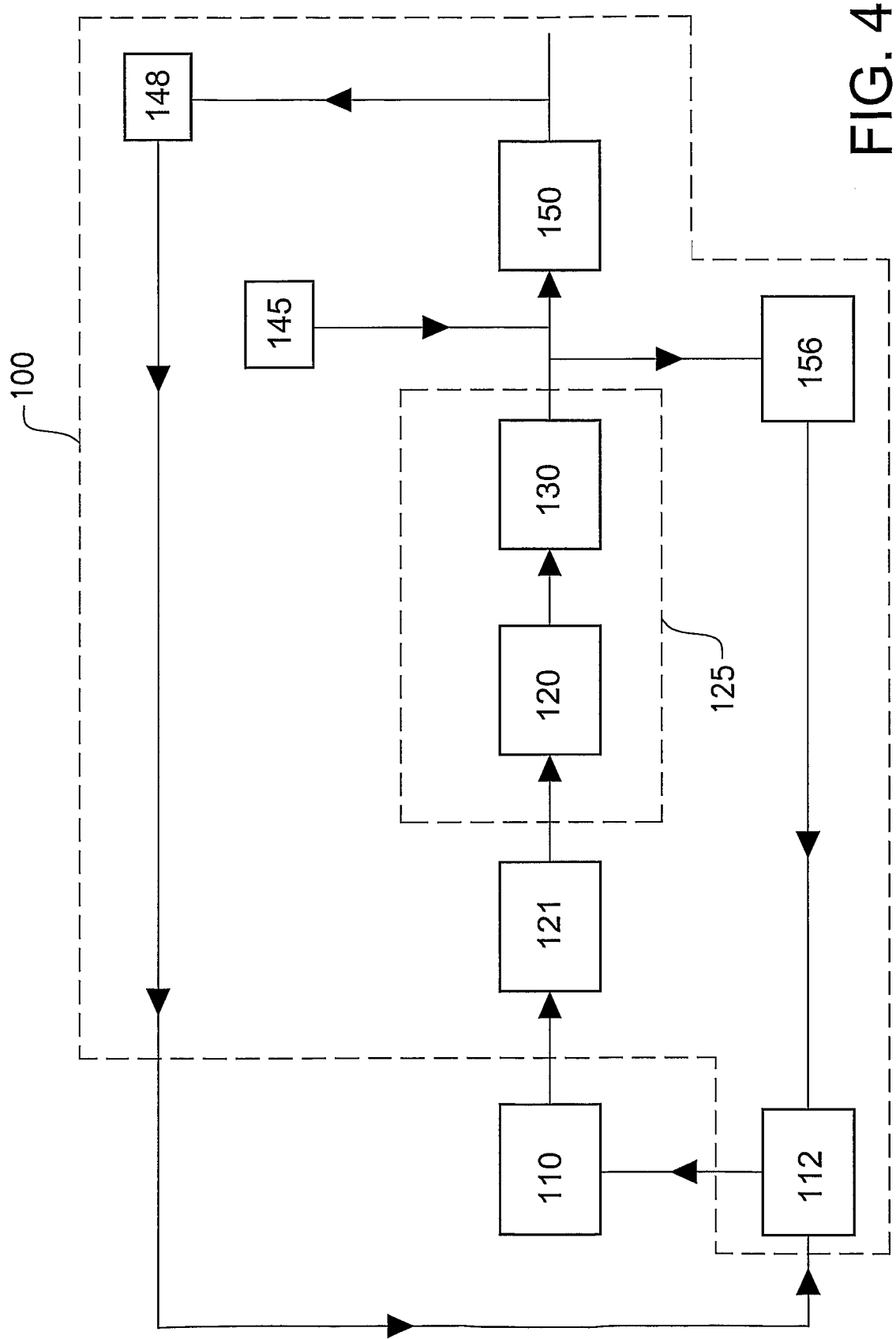
FIG. 4 shows a schematic illustration of a fourth example embodiment of an exhaust gas after treatment system according to the present invention in fluid connection with an internal combustion engine.

In FIG. 4 it is illustrated another example embodiment of the exhaust gas after treatment system (EATS) 100 according to the present invention. This embodiment differs to the one depicted in FIG. 1 in that a separate heat generator 121 is arranged between the internal combustion engine 110 and the DPFU 125. Here, similar to the embodiment in FIG. 2 and FIG. 5 illustrates yet another example embodiment of the exhaust gas after treatment system (EATS) 100 according to the present invention. This embodiment differs to the embodiment illustrated in FIG. 1 in that a NO2 reduction catalyst 140 and the SCR 150 are arranged as a combined unit 155 and that a injector 135 is provided upstream of said combined unit 155. In one embodiment said NO2 reduction catalyst 140 is arranged as a zone coating Z1 (shown schematically by dashed lines) on a SCR substrate, i.e., at least a first part of the SCR substrate may be coated with NO2 reduction catalyst material and at least a second part of said SCR substrate may be coated with SCR catalyst material. The order of zone coatings of NO2 and SCR catalyst material may be changed. In one embodiment there is a first zone of NO2 catalyst coating upstream of a second zone of SCR coating. In another embodiment there is a plurality of NO2 coating spaced apart from each other in between which there are provided SCR coatings.

In an alternative embodiment said NO2 reduction catalyst 140 and said SCR 150 are arranged as separate units.

In yet another example embodiment said NO2 reduction catalyst material may be arranged as a zone coating Z2 (shown schehematically in FIG. 5 by dashed lines) a DPF substrate i.e., at least a first part of the DPF substrate may be coated with DOC reduction catalyst material and at least a second part of said DPF substrate may he coated with NO2 catalyst material. The order of zone coatings of NO2 and DOC catalyst material may be changed. In one embodiment there is a first zone of DOC catalyst coating upstream of a second zone of NO2 coating. In another embodiment there is a plurality of DOC coating spaced apart from each other in between which there are provided NO2 coatings. As seen schematically in FIG. 5. the NO2 reducing agent may also be introduced via an injector 145' (shown in phantom) upstream of DPF, such as where a zone coating of the NO2 reduction catalyst is provided on the DPF.

In said NO2 reduction catalyst 140 the following reactions may take place:

$$2NO_2 + CH_2 \rightarrow NO + CO + H_2O \tag{10}$$

$$3NO_2 + CH_2 \rightarrow NO + CO_2 + H_2O \tag{11}$$

From reactions No. (10) and (11) it is clear that the NO2 reduction catalyst 140 reduces NO2 into NO. Without the NO2 reduction catalyst 140 it is a trade-off between optimal passive regeneration and HC oxidation in the DOC 120/DPF 130 and high NOx-conversion in the SCR system 150. By adding the NO2 reduction catalyst 140 downstream of the DPF 130 and/or DPFU 125 such trade-off problem may be solved. The NO2 reduction catalyst 140 acts as a balancer to balance the ratio of NO2/NO into the SCR 150. The NO2 reduction catalyst 140 will allow high noble metal loading on the DOC120 and/or DPF 130 (good. NO- and HC-oxidation) at the same time as an optimal NO2/NO ratio may be achieved for the SCR 150. A reducing agent such as fuel (HC based fuel such as diesel) or urea may be added, by a injector denoted by 135 upstream of said NO2 reduction catalyst 140 for obtaining the NO2->NO reduction. In another embodiment said injectors 135 and 145 may be a single unit, i.e, one injector for injecting reducing agent both for the SCR 150 and NO2 reduction catalyst 140.

With the NO2 reduction catalyst 140 it may also be possible to have optimal passive regeneration and HC-oxidation for an aged SCR system 150 while still maintaining high NOx-conversion for the fresh systems. It will also be possible to use a smaller SCR-catalyst 150, giving both cost, space and weight benefits.

The temperature in the NO2 reduction catalyst 140 may be from about 250° C. to about 600° C., more details can be found in WO 2006/040533. The NO2 reduction catalyst 140 may be based on a zeolite material, more details can be found in WO 2006/040533.

In still another example embodiment of the present invention there is a combination of a NO2 catalyst zone coating on the DPF substrate and a NO2 catalyst zone coating on the SCR substrate. Such NO2 coating may be provided as a single zone or plurality of zones on one or both of said DPF and/or SCR units.

Engine-out NOx can be continuously controlled between the levels of the high- and low-NOx mode using either or both the NOx sensor 148 and/or the temperature sensor 156.

Although different embodiments have been illustrated in different figures, it is to be understood that combinations of the embodiments depicted in the figures is also possible. For instance, one may combine the embodiment in FIG. 1 with the embodiment in FIG. 2 another combination may be with FIG. 1 and FIG. 3. For the skilled person in the art it is obvious that any one of the embodiment may be combined with any one or a plurality of the other embodiments.

It is to be understood that the present invention is not limited to the embodiments described above and illustrated in the drawings; rather, the skilled person will recognize that many changes and modifications may be made within the scope of the appended claims.

The invention claimed is:

1. An exhaust gas after treatment system comprising
   a diesel particulate filter unit (DPFU) provided downstream of a diesel engine,
   a selective catalytic reduction (SCR) arrangement provided in fluid communication with the DPFU,
   a first injector for feeding reducing agent into the exhaust gas provided downstream of the DPFU and upstream of the SCR,
   a NOx coordinator;
   at least one NOx sensor provided downstream of the SCR providing at least one NOx signal to the NOx coordinator,
   at least one temperature sensor provided at least one of upstream and downstream of the SCR providing at least one temperature signal regarding a value of temperature to the NOx coordinator, wherein
   the NOx coordinator switches the diesel engine into either one of a high NOx mode or a low NOx mode depending on the values of at least one of the at least one NOx signal and the at least one temperature signal, and the NOx coordinator comprises a controller programmed to switch the diesel engine into the high NOx mode or the low NOx mode when the values of the at least one of the at least one NOx signal and the at least one temperature signal exceed threshold NOx or temperature values.

2. The exhaust gas after treatment system according to claim 1, wherein the diesel engine is switched into the low or high NOx mode by changing one or more of the following parameters; amount of exhaust gas recirculation (EGR), boost pressure, timing of fuel injection, fuel injection pressure, number of fuel injections.

3. The exhaust gas after treatment system according to claim 1, wherein the switching from high NOx mode to low NOx mode is performed when the NOx signal is above a predetermined threshold value.

4. The exhaust gas after treatment system according to claim 3, wherein the threshold value of the NOx signal is related to the emission legislation value.

5. The exhaust gas after treatment system according to claim 1, wherein the switching from low NOx mode to high NOx mode is performed when the NOx signal is below a predetermined, threshold value and the temperature signal is between a first temperature T1 and a second temperature T2.

6. The exhaust gas after treatment system according to claim 5, wherein the predetermined threshold value is dependent upon one or more of the following parameters: at least one of the exhaust gas flow and NO2/NO ratio and is further adaptive.

7. The exhaust gas after treatment system according to claim 5, wherein the first temperature T1 is dependent upon one or more of the following parameters: at least one of the exhaust gas flow and NO2/NO ratio and is further adaptive.

8. The exhaust gas after treatment system according to claim 1, wherein the switching from low NOx mode to high NOx mode is further dependent on at least one of a content of urea and a predicted amount of soot in the DPFU.

9. The exhaust gas after treatment system according to claim 1, wherein the DPFU is a diesel particulate filter (DPF) coated with an oxidation catalyst.

10. The exhaust gas after treatment system according to claim 1, wherein the DPFU comprises a diesel oxidation catalyst (DOC) capable of converting NO to NO2 upstream of a diesel particulate filter (DPF).

11. The exhaust gas after treatment system according to claim 1, wherein a heat generator is provided between the diesel engine and the DPFU.

12. The exhaust gas after treatment system according to claim 11, wherein the heat generator consists of a DOC able to convert fuel to carbon dioxide and water.

13. The exhaust gas after treatment system according to claim 12, wherein the heat generator consists of a burner.

14. The exhaust gas after treatment system according to claim 1, further comprising a NO2 reduction catalyst provided in fluid communication with the DPFU and the SCR.

15. The exhaust gas after treatment system according to claim 14, wherein the NO2 reduction catalyst is provided downstream the DPFU and upstream of the SCR.

16. The exhaust after treatment system according to claim 14, wherein the NO2 reduction catalyst is arranged as at least one of a zone coating on the SCR and as a zone coating on the DPFU.

17. An exhaust gas after treatment method comprising the actions of:
   oxidizing NO into NO2 and trapping combustion particles in a diesel particulate filter unit (DPFU) provided in fluid communication with a diesel engine,
   reducing NO2 into NO in a selective catalytic reduction (SCR) arrangement arranged in fluid communication with the DPFU,
   injecting a reducing agent by a first injector into the exhaust gas arranged upstream of the SCR,
   providing a NOx signal to a NOx coordinator from at least one NOx sensor provided downstream of the SCR,
   providing a temperature signal regarding a value of temperature to the NOx coordinator from at least one temperature sensor provided at least one of upstream and downstream of the SCR,
   switching the diesel engine into either one of a high NOx mode or a low NOx mode depending on the values of at least one of the at least one NOx signal and the at least one temperature signal,
   wherein the NOx coordinator comprises a controller programmed to switch the diesel engine into the high NOx mode or the low NOx mode when the values of the at least one of the at least one NOx signal and the at least one temperature signal exceed threshold NOx or temperature values.

18. The exhaust gas after treatment method according to claim 17, wherein the diesel engine is switched into the law or high NOx mode by changing one or more of the following parameters: amount of exhaust gas recirculation (EGR), boost pressure, timing of fuel injection, fuel injection pressure, number of fuel injections.

19. The exhaust gas after treatment method according to claim 17, wherein the switching from high NOx mode to low NOx mode is performed when the NOx signal is above a predetermined threshold value.

20. The exhaust gas after treatment method according to claim 19, wherein the threshold value of the NOx signal is related to the emission legislation value.

21. The exhaust gas after treatment method according to claim 17, wherein the switching from low NOx mode to high NOx mode is performed when the NOx signal is below a predetermined threshold value and the temperature signal is between a first temperature T1 and a second temperature T2.

22. The exhaust gas after treatment method according to claim 21, wherein the predetermined threshold value is dependent upon one or more of the following parameters: at least one of the exhaust gas flow and NO2/NO ratio and is further adaptive.

23. The exhaust gas after treatment method according to claim 21, wherein the first temperature T1 is dependent upon one or more of the following parameters: at least one of the exhaust gas flow and NO2/NO ratio and is further adaptive.

24. The exhaust gas after treatment method according to claim 17, wherein the switching from low NOx mode to high NOx mode is further dependent on at least one of a content of urea and a predicted amount of soot in the DPFU.

25. The exhaust gas after treatment method according to claim 17, further comprising the action of coating a diesel particulate filter (DPF) with an oxidation catalyst material.

26. The exhaust gas after treatment method according to claim 17, further comprising the action of providing a diesel oxidation catalyst (DOC) capable of converting the NO to NO2 downstream with a diesel particulate filter (DPF) capable of trapping the combustion particles.

27. The exhaust gas after treatment method according to claim 26, wherein the DOC is provided upstream of the DPF.

28. The exhaust gas after treatment method according to claim 17, further comprising the action of providing a heat generator between the diesel engine and the DPFU.

29. The exhaust gas after treatment method according to claim 17, wherein the heat generator consists of a diesel oxidation catalyst (DCC) able to convert fuel to carbon dioxide and water.

30. The exhaust gas after treatment method according to claim 17, wherein the heat generator consists of a burner.

31. The exhaust gas after treatment method according to claim 17, farther comprising the action of providing a NOX sensor downstream a NO2 reduction catalyst.

32. The exhaust gas after treatment method according to claim 31, further comprising the actions of:
applying the NO2 reduction catalyst as a zone coating on the DPF, and
arranging the first injector upstream the zone coating.

33. The exhaust after treatment method according to claim 31, further comprising the actions of
arranging the NO2 reduction catalyst as a zone coating on the SCR arrangement, and
arranging the first and a second injector is as a single unit downstream the DPFU and upstream the NO2 reduction catalyst and SCR arrangement.

34. The exhaust after treatment method according to claim 17, further comprising the actions of
arranging the NO2 reduction catalyst as a zone coating on the SCR arrangement and as a zone coating on the DPF, and
arranging the first injector upstream the NO2 reduction catalyst zone coating on the DPF.

35. A non-transitory computer readable medium comprising a program code for performing the method as claimed in claim 17.

* * * * *